Feb. 16, 1932.  V. K. SNELL  1,845,353
HEAT INSULATING CONSTRUCTION
Filed Dec. 14, 1928
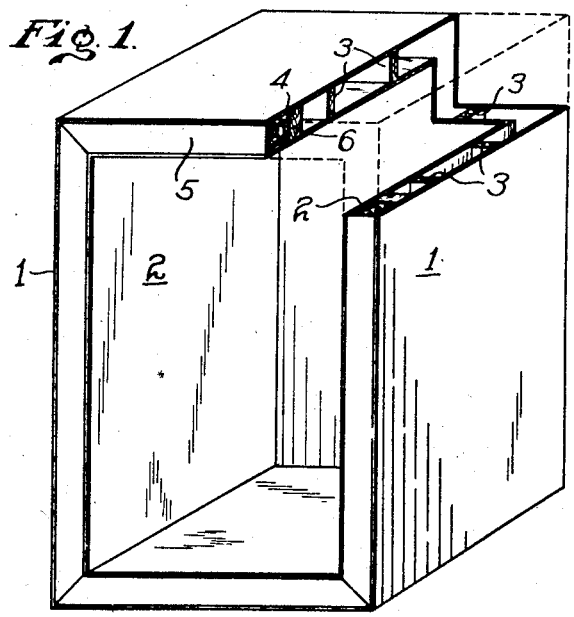
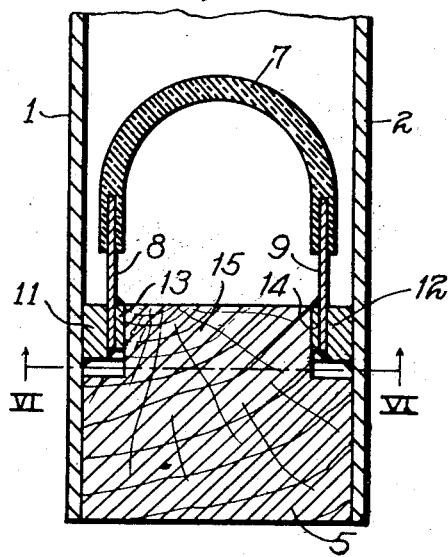
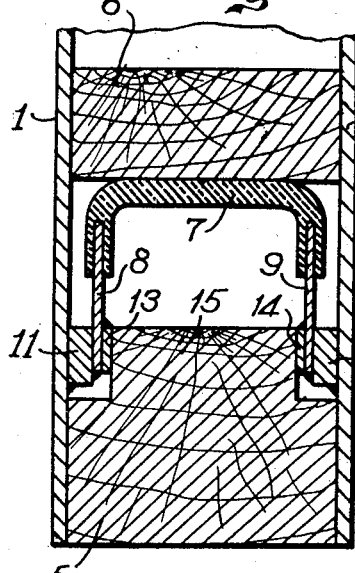
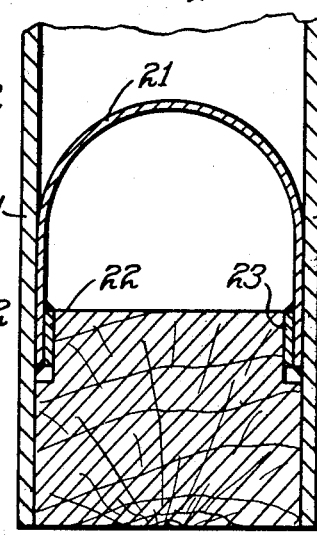
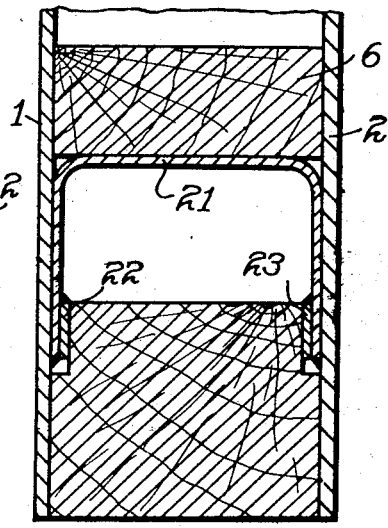
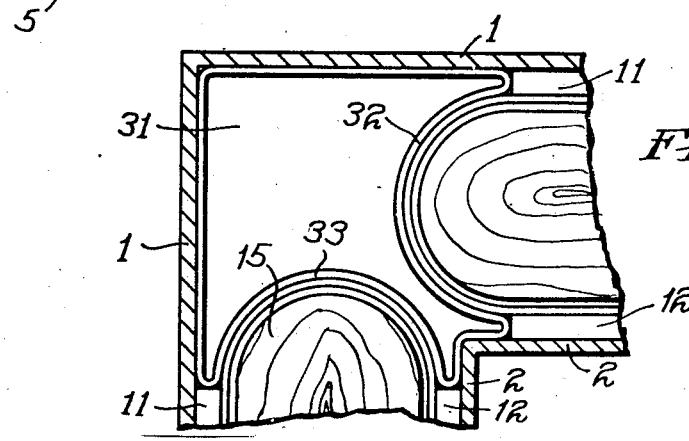
INVENTOR
Virgil K. Snell
by Brown & Critchlow
his attorneys Patented Feb. 16, 1932

1,845,353

UNITED STATES PATENT OFFICE

VIRGIL K. SNELL, OF WILKINSBURG, PENNSYLVANIA

HEAT-INSULATING CONSTRUCTION

Application filed December 14, 1928. Serial No. 326,086.

This invention relates to double walled heat insulating structures of the vacuum type, and more particularly to a seal of low heat conductivity for sealing the edges or end of the walls of such a structure.

Heretofore it has been the customary practice to make the walls of double vacuum type heat insulating structures air-tight by attaching to the edge of the structure or to the ends of its walls around openings in the wall or at the ends of a section of the wall, a strip of material which is similar to that making up the walls. This strip is usually a metal plate having a comparatively high heat conductivity. Consequently considerable heat is conducted through such a seal from the warmer to the cooler of the two walls of the insulating structure, thereby reducing the efficiency of the insulation. Furthermore, such a seal because of its rigidity has a tendency to give away rather easily when subjected to comparatively light shocks or jars as are commonly encountered in handling and in service, accordingly the vacuum upon which the insulating efficiency of the wall depends is comparatively easily destroyed.

One of the typical and most practical applications for insulating structures of this character is in the manufacture and use of refrigerator cabinets, and in these it is quite necessary that the vacuum be maintained at its maximum and in the most efficient manner. Hence it is very desirable that a seal be provided for the insulating or cabinet walls which is not only efficient, but which is also capable of being subjected to comparatively rough treatment without failing. For commercial purposes it is also necessary that the seal be not prohibitively expensive.

The object of this invention therefore is to provide an inexpensive imperforate seal having low heat conductivity for sealing the edges or ends of the walls of double walled vacuum type heat insulation structures.

A further object is to provide a seal of the above described character, which may be readily and comparatively easily attached to the walls of the structure, and which may be subjected to substantially severe shocks, or comparatively rough handling without failing.

Other objects will become apparent and a better understanding of the invention will be had when the following detailed description is read in conjunction with the accompanying drawings, in which Fig. 1 is a perspective view of a refrigerator cabinet embodying one of the forms of my invention, a section of the cabinet being cut away to illustrate the way the seal strip is positioned between the ends of the walls of the structure at the point where the door, not shown, is mounted; Figs. 2, 3, 4 and 5 are cross sectional views respectively of four different forms or modifications of the invention; and Fig. 6 a plan view of a corner plate designed for attaching strips of the seal to the corners of an opening in the cabinet.

Referring to Fig. 1 of the drawings, there is illustrated a simple refrigerator cabinet comprising an outer wall 1 and an inner wall 2 separated a suitable distance from each other and held by separators 3 against collapse from atmospheric pressure when the air between the walls is exhausted. To prevent heat from being conducted from one wall of the structure to the other, these separators are made out of some suitable heat insulating materials, such as wood. The cabinet, as illustrated, has one of its ends open, and in this opening the usual door, not shown, is mounted. In order to exhaust air from the chamber formed between inner and outer walls 1 and 2 of the structure, it is necessary to seal the ends of these walls around the opening. In accordance with this invention this is done, as described more in detail hereinafter, by securing to the ends of the walls an imperforate seal 4 having low heat conductivity and sufficient flexibility to withstand a considerable amount of rough treatment without breaking and destroying the vacuum. Between, and flush with the ends of, the walls there is arranged a supporting frame 5 which is adapted to hold the outermost edges of walls 1 and 2 in place, and as here illustrated also functioning as a door jam for supporting a door, not shown. This frame is made of wood or some other heat insulating material, similar to separators 3.

Seal 4 which may take the form of any one of the embodiments of the invention shown in Figs. 2, 3, 4, or 5, is attached to walls 1 and 2 directly back of frame 5. In Fig. 2 the seal is illustrated as comprising a channel-like strip 7 of imperforate material of low conductivity, such as hard rubber or the like, in the edges of which there is tightly embedded a pair of thin flexible metal strips 8 and 9. These strips are made of metal so that the seal can be readily welded or otherwise attached to the walls of the insulating structure, and flexible so that jars and shocks will not easily break the strip from the walls.

To strengthen the seal joint, to facilitate the attachment of the seal strip to the walls, and to provide a space between the strip and the walls, of the structure, substantially thick metal strips 11 and 12, respectively, are welded or otherwise affixed on the inside of walls 1 and 2 for the reception of strips 8 and 9. To further reinforce the joint, and to make the attachment of strips 8 and 9 easier, a set of supporting strips 13 and 14 are mounted over the ends of these strips in the manner indicated. Support or door jam 5 is preferably provided with a portion 15 which extends between the seal mountings for firmly holding the seal joint against injury.

As will be readily understood, when the air is exhausted from between the walls of the insulating structure, tensional stresses are set up in the seal due to the atmospheric pressure. To counteract these stresses, a non-conducting supporting member or frame 6 may be placed between walls 1 and 2 inside and adjacent to the wall of seal 4. Fig. 3 shows a seal strip of the type illustrated in Fig. 2 adapted to be used with a supporting frame 6.

The modification of the invention illustrated in Figs. 4 and 5 comprises a seal strip formed of a comparatively thin metal strip 21, which, because of its thinness, is a very poor heat conductor, and because of its flexibility provides a seal joint which is not easily destroyed. To further reduce the amount of heat conducted through the seal, it is positiond between the walls in the form of a half loop, instead of being connected directly across the ends of the structure walls, thus making the path the heat must travel in the seal considerably longer.

Strip 21 may be attached to walls 1 and 2 in the same manner as the strip shown in Figs. 2 and 3, or, as illustrated in Figs. 4 and 5, it may be welded directly to walls 1 and 2, with supporting strips 22 and 23, respectively attached to it for reinforcing the joint. Fig. 5 illustrates seal strip 21 arranged in a wall with a frame 6 supporting it in the same way the seal strip shown in Fig. 3 is supported.

While the seal strips may be made in a shape to fit most openings in the insulating wall, such as the door openings in a refrigerator cabinet, in some cases, because of the size of the openings, such practice will be impossible. Where the latter condition prevails the seals should be applied in the form of long strips joined together at their ends. If the seals consist entirely of metal, as shown in Figs. 4 and 5, it is not much of a problem to weld them together at their ends or in the corners. But where the seals take the form shown in Figs. 2 and 3 it is desirable to provide special means for joining the seal strips together. An embodiment of a device for joining the ends of two seal strips in a corner is illustrated in Fig. 6, and comprises a corner plate 31 adapted to be welded to the walls of the insulating structure opening. Plate 31 is provided with inset portions 32 and 33 which receive the ends of the two adjacent seal strips. In order to attach the ends of the seal strip to the corner device, the strip ends should be rounded off, and the metal strips 8 and 9 made continuous around the end so that they can be welded to the inset portions 32 and 33 in the same way they are welded to the walls of the structure itself.

It will be understood by those skilled in the art that by making the seal strips flexible they will absorb most of the vibration due to shocks and jars imparted to the insulating structure while in service. Accordingly, the joints between the seal strips and the walls to which they are attached will not be appreciably damaged by shocks. Hence, the vacuum in the wall chambers will not be easily destroyed, though the structure be subjected to rough usage. Furthermore, by being formed of material of low heat conductivity they permit but a small amount of heat to pass from one wall of the insulating structure to the other, consequently increasing its efficiency.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. A seal for the edges or wall ends of a double walled vacuum type heat insulating structure, comprising a strip of imperforate non-metallic material of low conductivity having a pair of comparatively thin flexible metal strips imbedded in the edges thereof for attaching the strip to the walls of the insulating structure in such a way as to support a vacuum.

2. In combination with a double walled vacuum type heat insulating structure, a seal for the wall ends thereof comprising a strip of imperforate material of low heat conductivity flexibly attached to the walls of said insulating structure, and a frame of insulating material arranged between said walls in supporting contact with said seal strip.

3. In the combination of a double walled vacuum type heat insulating structure, a seal for the wall ends thereof comprising a strip of imperforate material of low heat conductivity having two metallic strips imbedded in the edges thereof for attaching the strip to the walls of the structure, and a support of non-conducting material arranged between the walls of the structure in contact with said seal for supporting it against stresses set up therein by atmospheric pressures.

4. In combination with a double walled vacuum type heat insulating structure, a thin flexible seal of imperforate material of low heat conductivity flexibly attached to the walls of said insulating structure, said seal being provided with a length in excess of the distance between said walls whereby to permit lateral displacement of the walls without impairing the sealed engagement between them and the seal, and a frame of insulating material for spacing the walls from one another arranged between them in supporting relation with the seal.

5. In combination with a double walled vacuum type heat insulating structure, a thin flexible seal including a thin metallic strip of low heat conductivity attached to the walls of said structure, said seal having a length in excess of the distance between said walls to permit lateral displacement of the walls without impairing the sealed engagement between them and the seal, and a frame of insulating material for spacing the walls from one another arranged between them in supporting relation with said seal.

In testimony whereof I sign my name.

VIRGIL K. SNELL.